United States Patent [19]
Vogel et al.

[11] Patent Number: 5,485,320
[45] Date of Patent: Jan. 16, 1996

[54] METHOD AND APPARATUS FOR ADJUSTING ASYMMETRIC RECORDING SIGNALS

[75] Inventors: Russell Vogel, Santa Cruz; William D. Van Alstyne, Aptos; Gerald L. Pressman, Cupertino; Charles A. Linquist, Campbell; James L. Michelotti, San Jose; Paul A. Lind, Santa Cruz, all of Calif.

[73] Assignee: Trace Mountain Products, Inc., San Jose, Calif.

[21] Appl. No.: 67,312

[22] Filed: May 24, 1993

[51] Int. Cl.⁶ .............................. G11B 27/36; G11B 5/02
[52] U.S. Cl. .............................. 360/31; 360/27; 360/33.1
[58] Field of Search ........................ 360/27, 51, 53, 360/67, 68, 31, 32, 45, 77.07, 106, 33.1

[56] References Cited

U.S. PATENT DOCUMENTS

| | | | |
|---|---|---|---|
| 4,466,089 | 8/1984 | Wachi | 360/32 X |
| 4,669,013 | 5/1987 | Scranton et al. | 360/106 |
| 5,185,681 | 2/1993 | Volz et al. | 360/77.04 X |
| 5,204,788 | 4/1993 | Kasagi et al. | 360/67 |
| 5,262,904 | 11/1993 | Tang et al. | 360/45 |
| 5,278,702 | 1/1994 | Wilson et al. | 360/51 |
| 5,333,084 | 7/1994 | Galloway et al. | 360/77.07 |

*Primary Examiner*—Aristotelis Psitos
*Assistant Examiner*—Patrick Wamsley
*Attorney, Agent, or Firm*—Edward B. Weller

[57] ABSTRACT

In a magnetic recording system, an asymmetry detector reverses the phase of a read, single-frequency test signal to indicate to a micro-controller whether recording signal asymmetry is present. Upon detecting such asymmetry, the micro-controller causes a current source coupled to the recording head to adjust a write current to correct the timing of a written data signal.

9 Claims, 7 Drawing Sheets

METHOD AND APPARATUS FOR ADJUSTING ASYMMETRIC RECORDING SIGNALS

BACKGROUND OF THE INVENTION

1. Field of the Invention

The invention relates to electronic data storage and retrieval systems, particularly to magnetic recording systems.

2. Description of the Background Art

Magnetic recording systems are used widely for storing (i.e., writing) and retrieving (i.e., reading) digital or analog data signals to and from magnetic media, such as disks, tapes, drums, and the like. In the course of magnetic recording, however, signal asymmetry may arise when an initial, written signal does not remain substantially the same or "symmetric" to such written signal, when such written signal is read subsequently. Typically, because of non-uniformities or premagnetization in the magnetic media and/or the recording heads, undesirable signal asymmetry may result.

Conventionally to eliminate signal asymmetry from recording systems, a test signal is recorded in magnetic media, and based on a subsequent reading of the recorded test signal, a manual adjustment is made to the recording head circuitry to compensate for any detected signal asymmetry. The conventional approach, however, is manually tedious and does not adjust asymmetry in response to asymmetry arising subsequently to initial manual adjustment. Accordingly, there is a need for an improved technique for adjusting asymmetric recording signals.

SUMMARY OF THE INVENTION

The invention involves correcting signal asymmetry in a magnetic recording system by writing a test signal to a magnetic medium and then reading the written test signal to detect signal asymmetry therein, by phase-reversing and filtering the test signal. If the phase-reversed and filtered signal generates an indication signal, which is un-changed at the time of phase reversal, then no signal asymmetry is detected. However, if the indication signal changes, because the duty cycle of the subsequently-read test signal is not 50%, then signal asymmetry is detected.

To correct the detected asymmetry, a control signal, which modifies a write current passing through the recording head, is adjusted in response to the asymmetry indication. In particular, the magnitude of the control signal may be determined according to a linear regression analysis of previously-determined control signal magnitudes.

DESCRIPTION OF THE PREFERRED EMBODIMENT

Figure 1:
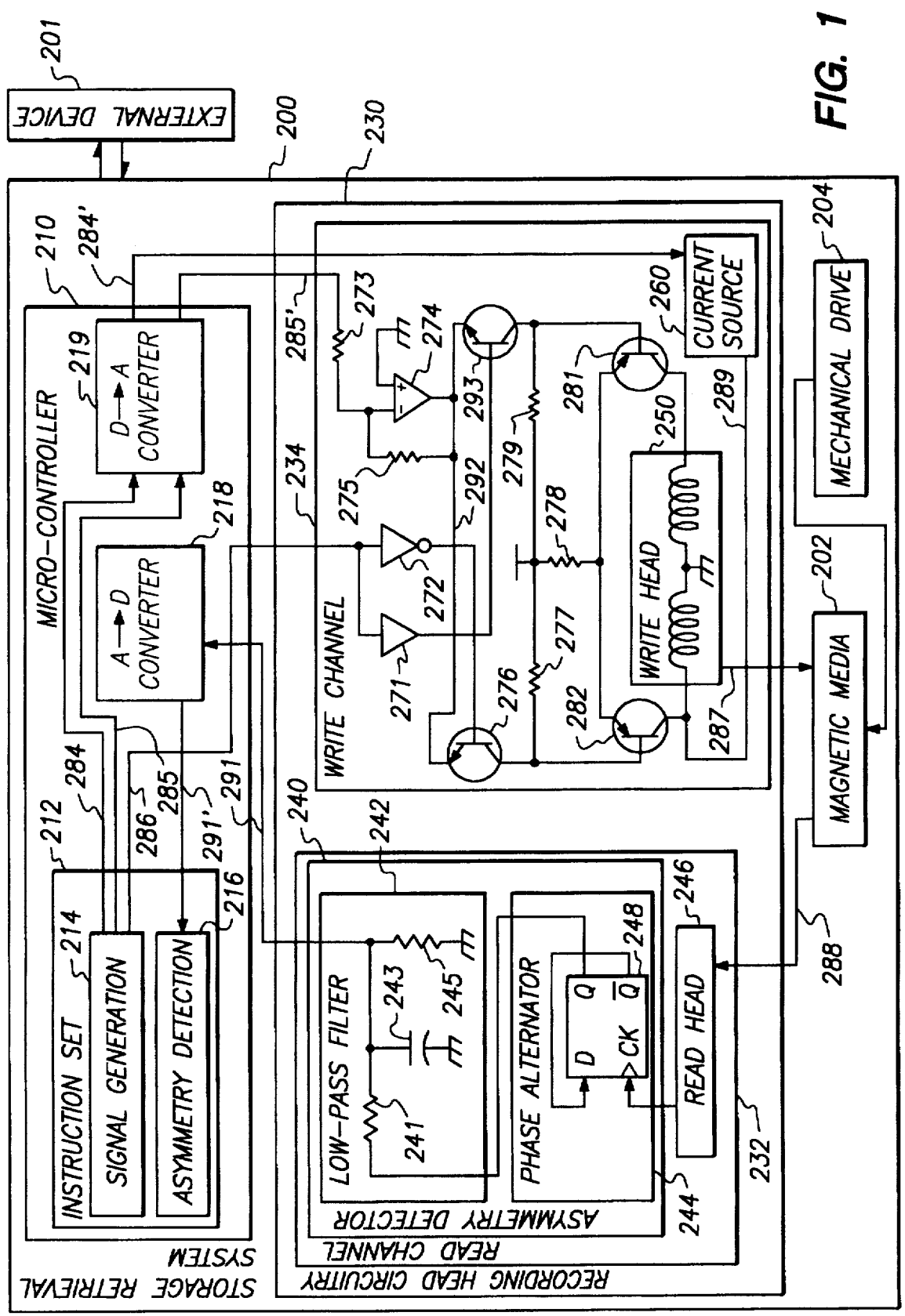
FIG. 1 is a generalized schematic block diagram of data storage-retrieval system 200 coupled to external device 201 and including micro-controller 210, recording head circuitry 230, magnetic media 202, and mechanical drive 204.

FIG. 1 is a generalized block diagram of data storage-retrieval system 200 coupled to external device 201, which may store and retrieve electronic data magnetic medi 202 coupled to mechanical drive 204 in storage-retrieval system 200. Storage-retrieval system includes a processor or micro-controller 210 and recording head circuitry 230 for reading and writing signals to magnetic medi 202, which may be a magnetic disk, drum, tape or the like.

Micro-controller 210 may include a conventional digital microprocessor and associated memory for controlling recording operations of storage-retrieval system 200 according to the present invention. Micro-controller 210 memory includes instruction set 212 for signal generation 214 and asymmetry detection 216 as described herein.

Micro-controller 210 may receive data signals from external device 201 and transmit or generate therefrom data signal 286 and control signals 284, 285 (and alternately control signal 1285) which are converted from digital to analog form 284', 285' by digital-to-analog converter 219, and received by write channel circuitry 234 through write head 250 in recording head circuitry 230 for writing or storing data signal 287 to certain storage locations in magnetic media 202.

Also in recording head circuitry 230, read channel circuitry 232, through read head 246, may retrieve or read from certain storage locations in magnetic media 202 data signal 288 to transmit or generate data signal 291, which is converted from analog to digital form 291' by analog-to-digital converter circuit 218, and thereby received by micro-controller 210 for transmission to external device 201.

In recording head circuitry 230, read channel circuitry 232 and write channel circuitry 234 are provided with read head 246 and write head 250 respectively for reading and writing data signals 288, 287 in magnetic media 202. It is contemplated that an integrated read-write head may serve the function of heads 246, 250. In accordance with the present invention, read channel circuitry 232 includes asymmetry detector 240 for detecting when read data signal 288 includes signal asymmetry.

Preferably, asymmetry detector 240 includes phase alternator 244 for receiving signal 288 as read by read head 246. Preferably, phase alternator 244 includes a divide-by-two circuit, such as D-type flip-flop 248 as configured in FIG. 1. In asymmetry detector 240, phase alternator 244 is coupled to low-pass filter 242, such as R-C circuit including resistors 241, 245 and capacitor 243 as configured in FIG. 1. Asymmetry detector 240 generates read, phase-reversed, and filtered data signal 291, which is received by A-D converter 218 in microcontroller 212 for generating digital-form signal 291'.

In write channel circuitry 234, write head 250 writes data signal 287 to magnetic media 202. To this end, write channel 234 receives from micro-controller 210 data signal 286 and control signals 284', 285'. In a preferred embodiment, control signal 284' is applied to current source 260, which is coupled to control write current applied to write head 250, preferably by controlling or balancing both, forward and backward, directions in write current passing through write head 250. In this embodiment, control signal 285' is received by amplifier circuitry including resistors 273, 275 and operational amplifier 274 as configured in FIG. 1. Such amplifier circuitry then generates drive signal 292, which is applied to transistors 276, 293, as configured in FIG. 1.

Furthermore, in write channel circuitry 234, data signal 286 is received from micro-controller 210, and data signal 286 is then buffered 271 and inverted 272 to be applied respectively, as configured in FIG. 1, to bases of transistors 293, 276. Additionally, transistors 276, 293 and resistors 277, 279, which are coupled to power, are coupled separately to bases of transistors 282, 281 respectively, as configured in FIG. 1. Also, power is coupled through resistor 278 to transistors 282, 281, as configured in FIG. 1. As thus configured, transistors 281, 282 are coupled to drive current in write head 250.

Figure 7:
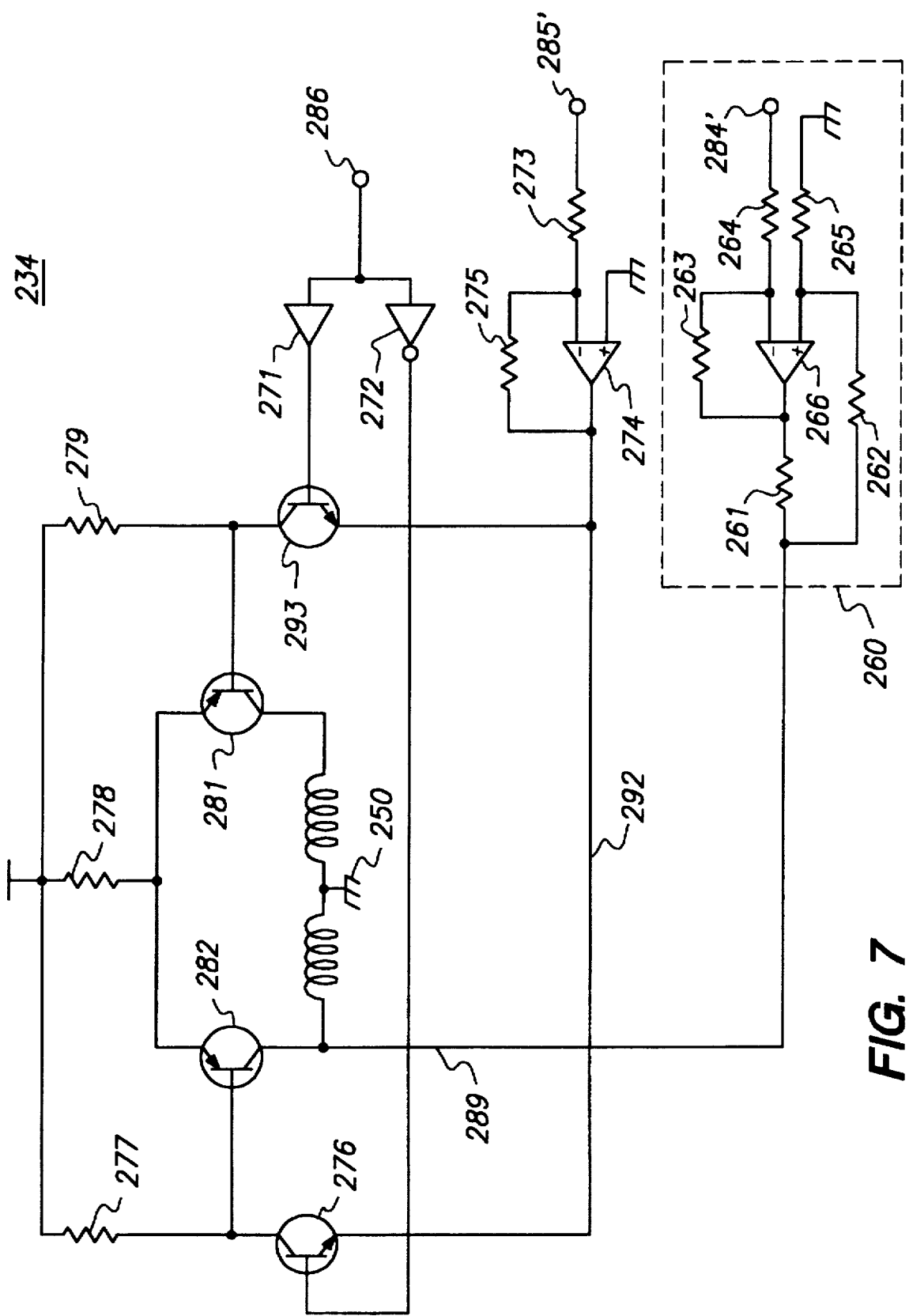
FIG. 7 is a generalized schematic block diagram of write channel 234 showing circuitry in current source 260.

In FIG. 7, a more detailed schematic of write channel circuitry 234 is shown to illustrate representative circuitry within current source 260. In this representation, current source 260 receives control signal 284' to generate control signal 289 coupled to write head 250. As configured in FIG. 7, current source 260 includes operational amplifier 266 coupled to resistors 261–266. In this configuration, signal 285' functions as a write-balance current, and signal 284' functions as an asymmetry control signal.

Figure 8:
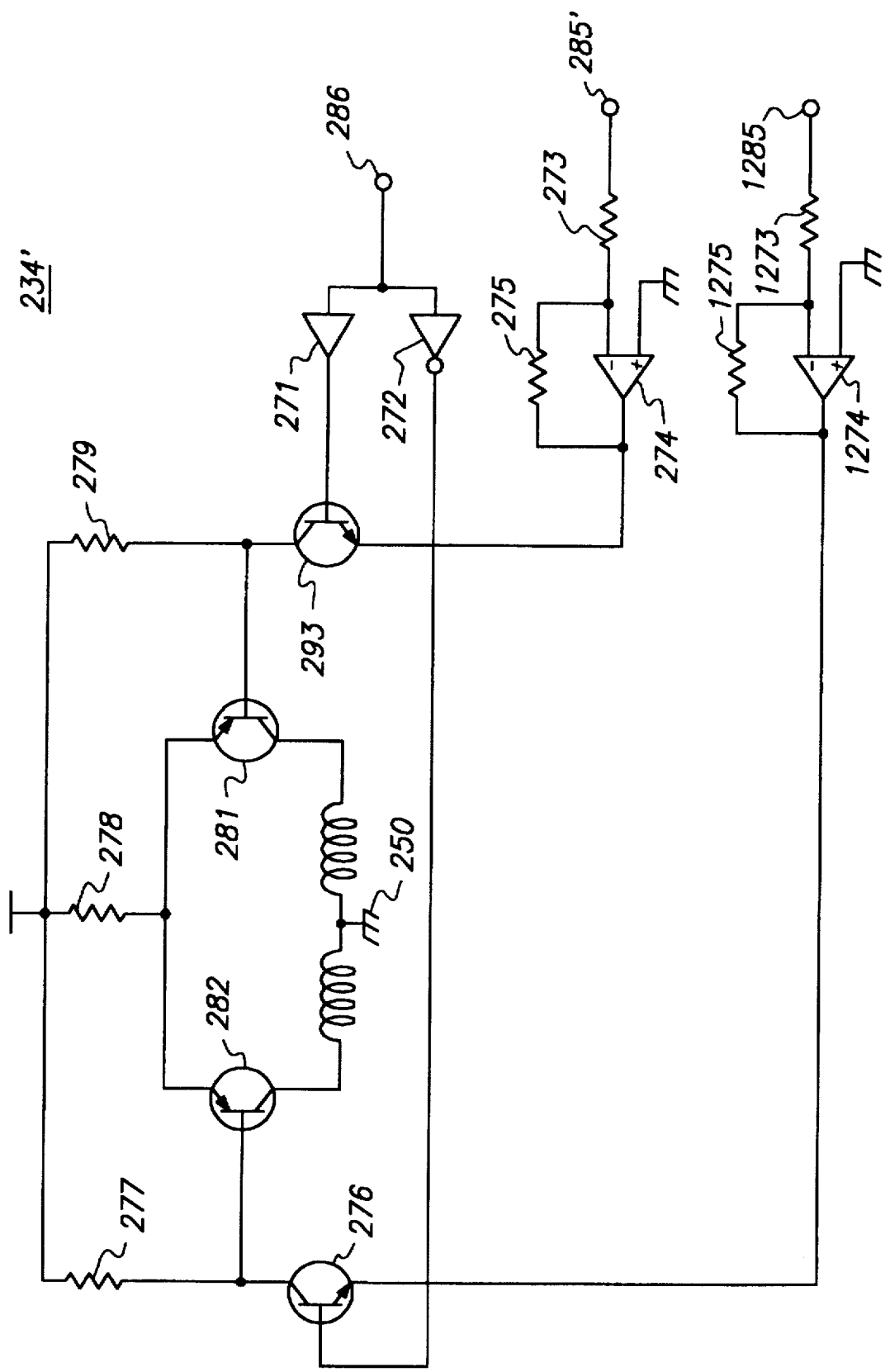
FIG. 8 is a generalized schematic block diagram of alternative write channel 234' showing dual write current sources 285', 1285.

In FIG. 8, an alternate embodiment of write channel circuitry 234' is shown. In this alternate embodiment, dual write control currents 285', 1285 are generated, preferably according to newly-calculated current balance values from linear regression analysis 150 in digital signal processing mode 140 from signal generation instructions 214 in micro-controller 210 to be applied respectively to transistors 293, 276 as configured in FIG. 8.

In the foregoing alternate configuration, unlike the configuration shown in FIGS. 1, 7, transistors 276, 293 are un-coupled from each other, such that signals 285', 1285 may balance write current applied to write head 250. In this regard, as shown in FIG. 8, write balance signal 285' is applied to resistor 273 coupled to operational amplifier 274 and resistor 275; and write balance signal 1285 is applied similarly to resistor 1273 coupled to operational amplifier 1274 and resistor 1275.

Figure 2:
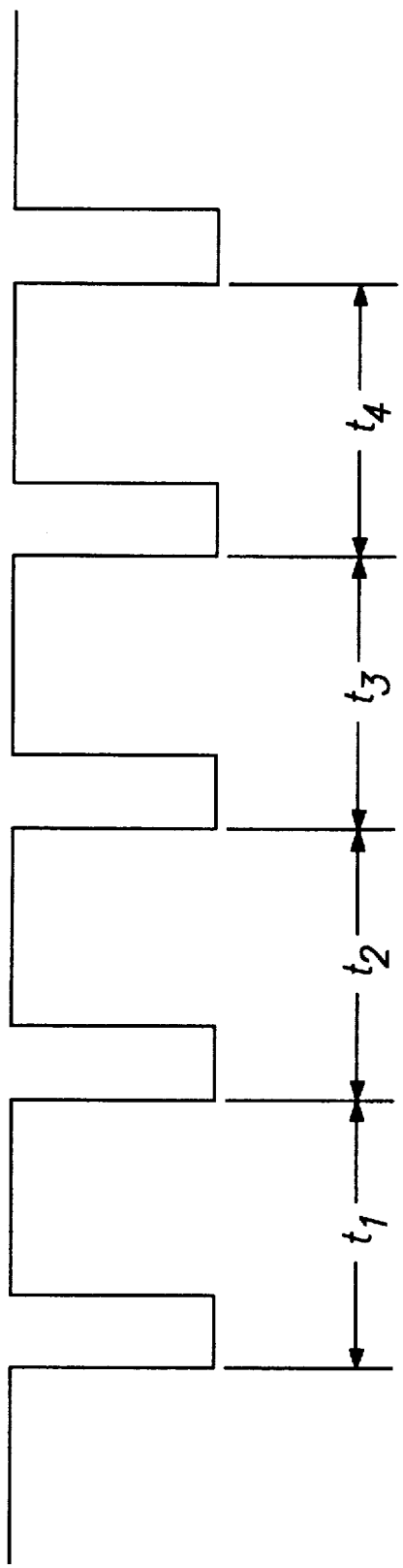
FIG. 2 is a representative timing diagram of data signal 286 showing no asymmetry.

In FIG. 2, a representative timing diagram shows data signal 286 generated by signal generation instructions 214 in microcontroller 210. Preferably, data signal 286 is generated to define a digital test pattern having a regular frequency, such that $t_1=t_2=t_3=t_4$, as shown in FIG. 2. In accordance with the present invention, data signal 286, which is written to magnetic media 202, includes equally-spaced signal pulses, such that the duty cycle of signal 286 is necessarily 50% when generated initially.

Figure 3:
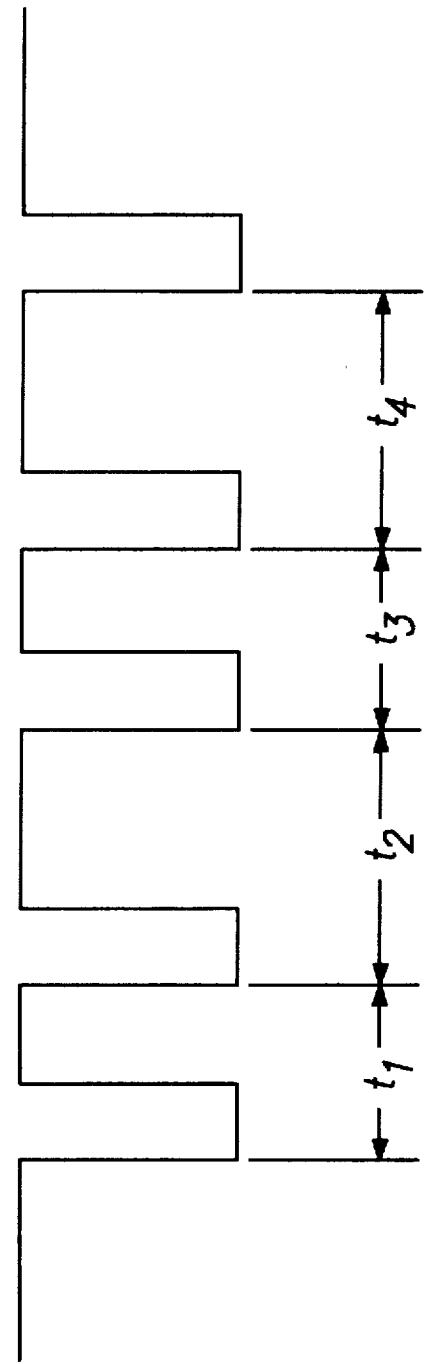
FIG. 3 is a representative timing diagram of data signal 288 showing asymmetry.

In FIG. 3, a representative timing diagram shows read data signal 288, which may be read by read head 246 from magnetic media 202, embodying signal asymmetry whereby signal pulse widths are not equal (i.e., asymmetrical) with each other. In this case, asymmetry may occur regularly insofar that $t_1=t_3$ and $t_2=t_4$, but $t_1$ not=$t_2$ and $t_3$ not=$t_4$.

Figure 4:
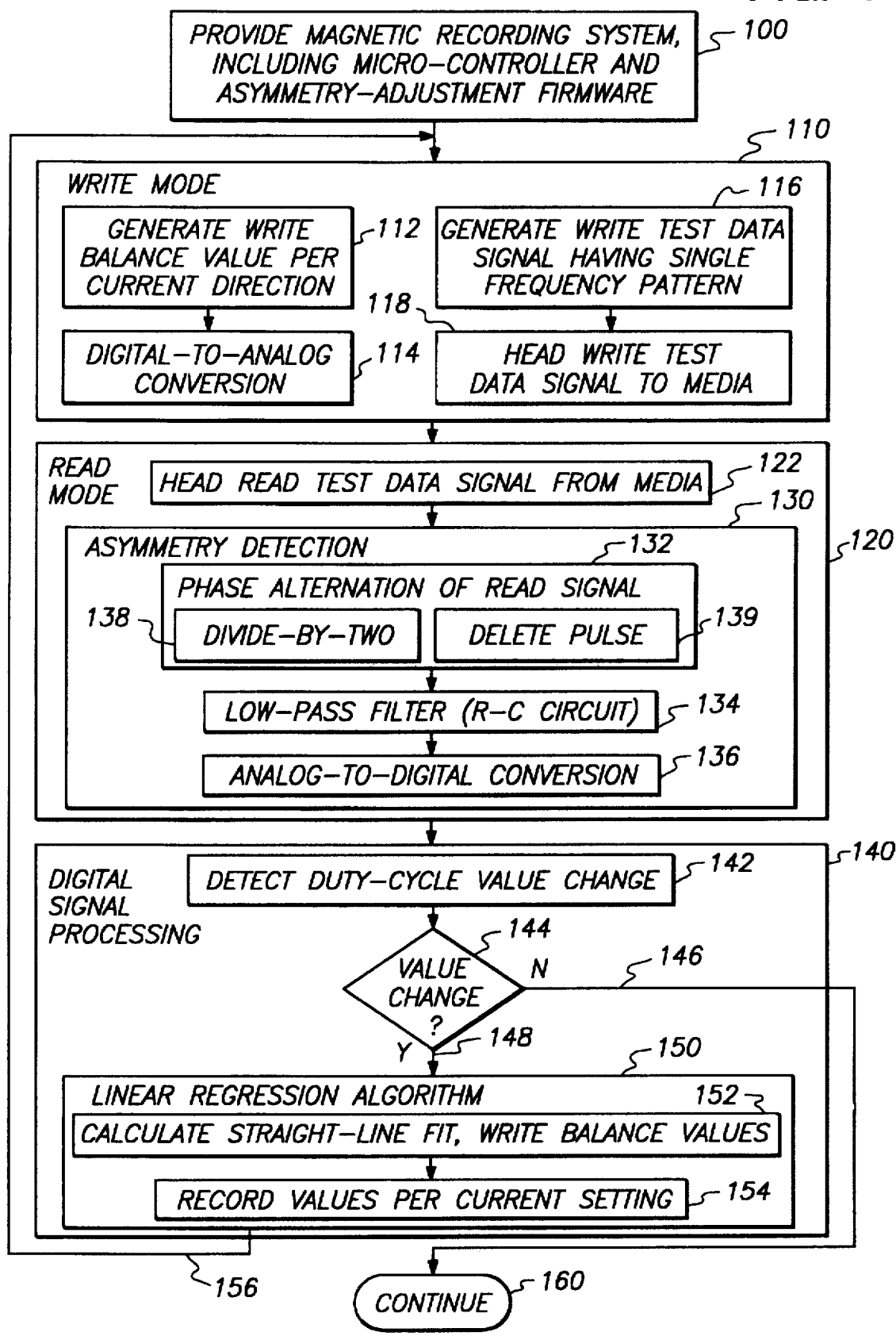
FIG. 4 is an operational flow chart of data storage-retrieval system 200, including generally write mode 110, read mode 120, and digital signal processing 140 steps.

In FIG. 4, a generalized flow chart shows the operation of a system such as storage-retrieval system 200 of FIG. 1.

Initially, a magnetic recording system is provided 100, including micro-controller and asymmetry adjustment firmware. The provided system operates in write mode 110, read mode 120, and digital signal processing mode 140.

During write mode 110, micro-controller 210 causes write channel circuitry 234 to generate 112, preferably according to signal generation instructions 214, a write-balance value for forward and backward write-current direction (i.e., in write head 250) in accordance with calculations performed by micro-controller 210 during digital signal processing mode 140. The generated value is processed 114 by D-A converter circuit 219 to produce control signals 284', 285' which are applicable to control or balance write current 289 in write head 250.

Also during write mode 110, micro-controller 210 generates, preferably according to signal generation instructions 214, write test data signal 286 having a single-frequency pattern and a 50% duty cycle, as shown in FIG. 2. In accordance with the present invention, such signal 286 is written 118 to magnetic media 202 by write head 250.

During read mode 120, micro-controller 210 causes read channel circuitry 232 to read 122 test data signal from magnetic media, through read head 246. The read signal is received from read head 246 by asymmetry detector 240 for asymmetry detection 130 of the read signal, preferably according to asymmetry detection instructions 216 executed by micro-controller 210.

During asymmetry detection 130, the read signal is phase-reversed or alternated 132, preferably by passing the read signal through divide-by-two circuit 248, and preferably deleting a pulse 139 from the read signal pulse train. Preferably, at least one phase reversal occurs during read-signal asymmetry detection and digital signal processing 140, as described herein.

Figure 5:
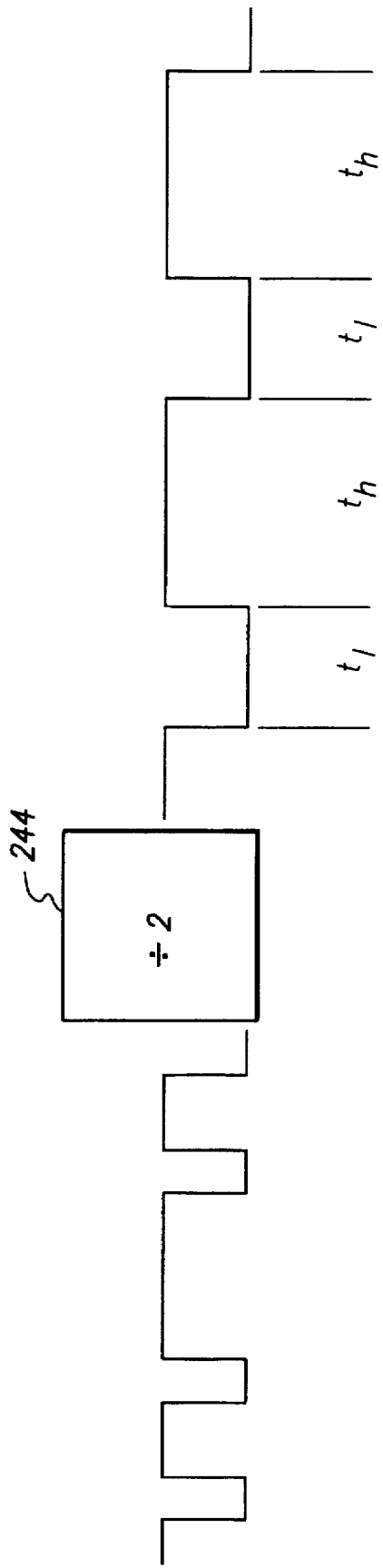
FIG. 5 is a representative timing diagram showing asymmetric data signal 288 before and after phase adjustment by divide-by-two circuit 244.
Figure 6:
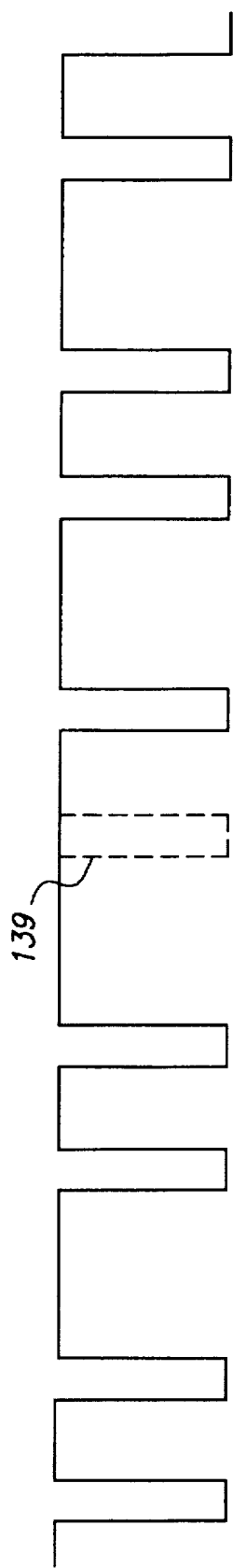
FIG. 6 is a representative timing diagram showing asymmetric data signal 288 with a deleted pulse 139.

In FIG. 5, a representative timing diagram shows phase alternator 244 performing a divide-by-two function on an incoming data signal from read head 246. In addition, in FIG. 6, pulse deletion 139 is illustrated, whereby such pulse deletion mathematically has the equivalent effect of phase reversal (i.e., of duty cycle.)

After phase alternation 132, the phase-reversed signal is filtered 134 through R-C, low-pass filter 242 to provide a steady-state value or signal magnitude (i.e., having a value of $100*T_d*(V_h+V_l)$, where $T_d$ is the duty cycle, and $V_h$ and $V_l$ respectively are logic high and low of the processed signal,) thereby indicating signal asymmetry. The value is then passed through 136 A-D converter 218 to convert its form for digital signal processing 140.

In accordance the present invention, the foregoing phase reversal and magnitude generation serves to allow micro-controller 210 to identify electronically and automatically the presence of signal asymmetry in the read signal, i.e., by detecting a value which is representative of duty cycle variation from 50%, when no signal asymmetry is assumed to exist in the read signal. In this regard, asymmetry detection is possible because, duty cycle varies as a function of read-signal asymmetry, and the output of phase alternator circuit 244 is similarly a function of such asymmetry.

During digital signal processing 140, micro-controller 210 evaluates or monitors the indicated value to detect 142 a change in duty cycle between a pre-recording duty cycle of generated signal 286 and a post-recording duty cycle of processed signal 291.

If there is a value change 144, 148, then a linear-regression analysis 150 is performed by micro-controller 210 to provide 156 a write-current balance value, preferably provided over a relatively wide value range, such that asymmetry detection is facilitated by off-balancing about a write signal symmetry or current balance point. During such analysis 150, micro-controller 210 calculates 152 a straight line fit of prior, recorded balance values to adjust a newly-generated, modified balance value, thereby electronically varying signal asymmetry. Each generated value is recorded 154 according to its corresponding write current setting. Such generated values are applicable by signal generation instructions 214 to apply for asymmetry correction control signals 284, 285 (and, in alternate embodiment shown in FIG. 8, control signal 1285, once converted by D-A converter 219 to analog form.)

After performing linear regression analysis 150, micro-controller 210 may repeat 156 for successive asymmetry correction trials write mode 110, read mode 120, and digital signal processing 140 to generate or adjust a new current balance value. In this way, storage-retrieval system 200 serves as a servo-mechanism having signal feedback to compensate or balance for subsequently-detected magnetic recording degradation which may contribute to signal asymmetry.

If no value change at the time of phase reversal is detected 142, 144, 146, then signal asymmetry is indicated and signal recordation continues 160. In accordance with the present invention, no such value change is detected when the processed read signal is determined by micro-controller 210 to have an unchanged, 50% duty cycle.

Figure 9:
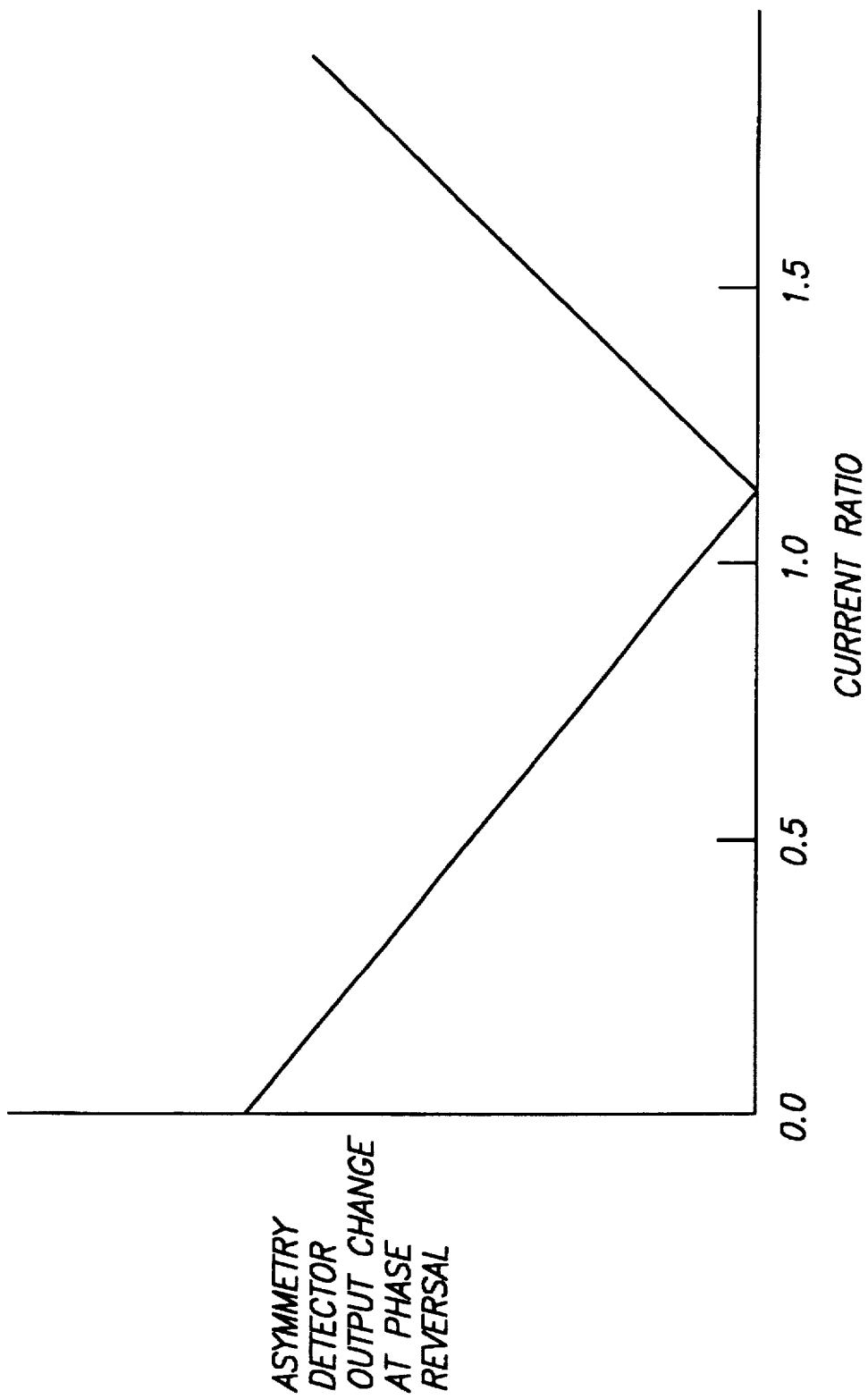
FIG. 9 is a graphical chart illustrating asymmetry detector output change at phase reversal as a function of current ratio.

In FIG. 9, a graphical chart illustrates the functional relationship between a representative current ratio and asymmetry detector output change at phase reversal, in accordance with the present invention. Thus, in this representation, when the vertex ("V") of the graphed curve indicates zero output change, the corresponding current ratio is appropriate for eliminating or correcting signal asymmetry. In accordance with the present invention, micro-controller 210 mathematically calculates or employs straight line fitting or linear regression 150 of previously-generated values to achieve graphically such zero output change, thereby finding a so-called "zero" or "null" point.

We claim:

1. A method for recording data in and reading data from a magnetic medium, the method comprising the steps of:

generating an asymmetry control signal;

writing a data signal to a magnetic medium responsive to the asymmetry control signal;

reading the written data signal from the magnetic medium;

dividing the read signal by two to produce a divided read signal;

filtering the divided read signal to generate an asymmetry indication;

repeating the generating, writing, reading, dividing, and filtering steps for a predetermined number greater than 2 of asymmetry control signals;

determining by a linear regression analysis a best fit function relating the asymmetry indications to the asymmetry control signals; and computing from the best fit function an asymmetry control signal for a null asymmetry indication.

2. The method of claim 1 wherein the step of dividing the read signal includes the step of deleting a pulse from the read signal and dividing by two to produce a phase reversal.

3. The method of claim 2 wherein the asymmetry indication signal is a change in the filtered signal resulting from the phase reversal of the divided signal.

4. The method of claim 3 further comprising the step of:

converting the asymmetry indication to a digital signal for the linear regression analysis.

5. The method of claim 1 wherein the step of dividing the read signal includes the step of adding a pulse to the read signal and dividing by two to produce a phase reversal.

6. The method of claim 5 wherein the asymmetry indication is a change in the filtered signal resulting from the phase reversal of the divided signal.

7. A method for recording data in and reproducing data from a magnetic medium, the method comprising the steps of:

writing a data signal to a magnetic medium;

obtaining a copy signal of the data signal from the magnetic medium;

comparing the data signal with the copy signal, including the step of adjusting a phase of the copy signal;

reversing the phase of the copy signal by dividing by two; and generating a control signal based upon the comparing step, the control signal being applicable to a recording head for writing data to the magnetic medium.

8. A method for recording and reproducing data in a magnetic medium, the method comprising the steps of:

a) writing to the magnetic medium a data signal, including a test pattern having a given frequency;

b) generating a control signal, the control signal being applicable to modify a current passing through a recording head for writing the data signal, the control signal being adjustable in response to an asymmetry indication signal, a magnitude of the control signal being determined according to an analysis of previously-determined control signal magnitudes; and c) reading the written data signal, reversing a phase of the read data signal by dividing by two, the phase-reversed data signal passing through a low-pass filter to generate the asymmetry indication signal, the filtered data signal passing through an analog-to-digital converter to generate a value which is processable by a controller, a modified control signal being generated when a change in the value is detected by the controller.

9. An apparatus for recording data onto and reading data from a magnetic medium, said apparatus comprising:

a recording circuit including
      a write circuit for recording a data signal onto a magnetic medium responsive to an asymmetry control signal, and
      a read circuit for reading written data from the magnetic medium;

a divider coupled to the recording circuit and having an output for providing a divided read signal indicative of the read signal divided by two;

a filter coupled to the divider and having an output for providing an asymmetry indication indicative of the filtered divided read signal;

a control circuit coupled to the read circuit and to the write circuit and having an output for providing the asymmetry control signal for controlling recording of data by the write circuit; and a controller coupled to the control circuit and to the processor for determining by a linear regression analysis a best fit function relating the asymmetry indications to the asymmetry control signals for a predetermined number greater than 2 of asymmetry control signals and for computing from the best fit function an asymmetry control signal indicative of a null asymmetry indication.

* * * * *